Jan. 21, 1969  J. J. PETHIS  3,423,141

BEARING SEAL CONSTRUCTION

Filed May 24, 1966

INVENTOR.
JAMES J. PETHIS
BY
Hopgood & Calimafde
ATTORNEYS.

United States Patent Office 3,423,141
Patented Jan. 21, 1969

3,423,141
BEARING SEAL CONSTRUCTION
James J. Pethis, Farmington, Conn., assignor to The Fafnir Bearing Company, a corporation of Connecticut
Filed May 24, 1966, Ser. No. 552,513
U.S. Cl. 308—187.2          6 Claims
Int. Cl. F16c 1/24, 33/78; F16j 15/12

ABSTRACT OF THE DISCLOSURE

An annular composite pop-out seal is described for closing off the annular chamber of an antifriction bearing comprising a metal ring having concentrically bonded thereto on at least one face thereof an annular sealing disc of resilient elastomeric material, said annular sealing disc having a peripheral bead of said elastomeric material which extends beyond the periphery of said metal ring, a freely projecting wiping portion extending radially inwardly and beyond the inner radial end of said metal ring, and at least one notch formed partially into one side of said elastomeric bead adjacent the periphery of the metal ring sufficient to render a peripheral portion of said metal ring accessible to a removing tool, whereby the seal can be removed from the bearing by inserting a probe tool into the notch and applying pressure to said peripheral portion of the metal ring.

---

This invention relates to a bearing seal for antifriction bearings and, in particular, to a composite, metal-reinforced, pop-out bearing seal capable of being easily mounted or removed, while retaining lubricant within and excluding dirt from the bearing.

Most seals employed in antifriction bearings are designed for the life of the bearing and, therefore, are generally permanently mounted within the bearing with that in mind. However, the life of such bearings depends to a large extent upon its lubrication. In instances of abnormal bearing use involving rather high bearing loads accompanied by a rise in temperature, the bearing lubricant may break down and produce a hard residue which may impede the efficent operation of the bearing and thus shorten the bearing life. As permanently installed seals prevent access to the lubricant chamber and generally are irreparably damage during removal, the bearing generally has to be replaced.

It is an object of the invention to provide an improved bearing seal construction capable of being easily removed from and reinserted without damage to the seal within a bearing for lubricant maintenance service.

Another object is to provide the combination of an antifriction bearing and an improved bearing seal therefor.

Figure 1:
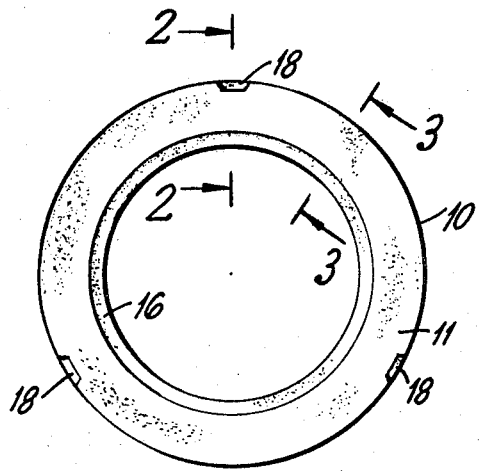
Figure 2:
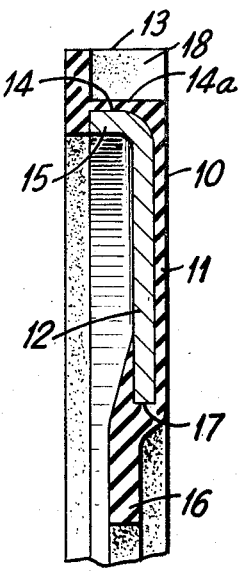
Figure 3:
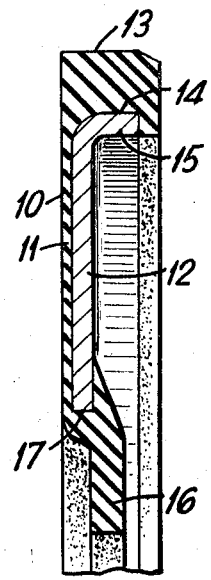
Figure 4:
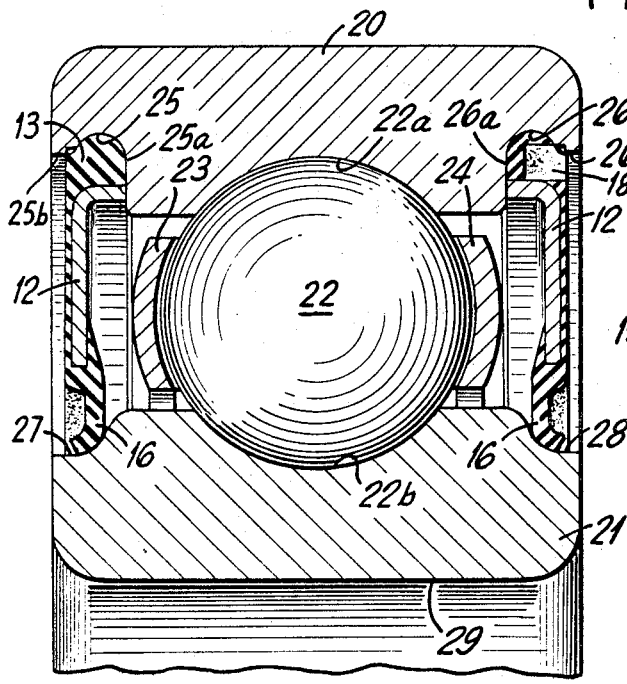
Figure 5:
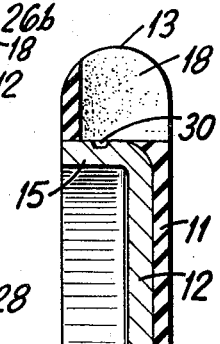
Figure 6:
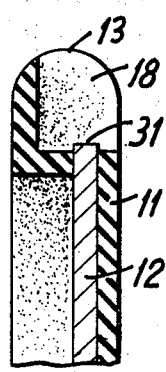

These and other objects will be appreciated from the following disclosure and the accompanying drawing, wherein:

FIG. 1 is a view in elevation of one embodiment of the bearing seal provided by the invention;

FIGS. 2 and 3 are cross sections of the seal of FIG. 1 taken along lines 2—2 and 3—3 as shown in FIG. 1;

FIG. 4 is illustrative of the bearing and seal combination provided by the invention; and FIGS. 5 and 6 are cross sections similar to those of FIGS. 2 and 3 but illustrating still further embodiments of the invention.

Stating it broadly, the invention is directed to an annular composite pop-out seal comprising a flat metal ring having concentrically bounded thereon on at least one face thereof an annular sealing disc of resilient elastomeric material. Among such materials are included natural rubber, such synthetic rubbers as Buna N rubber, butyl rubber (isobutylene-isoprene) and the like. In one embodiment of the invention, the annular sealing disc has a peripheral deformable bead which extends beyond the periphery of the metal ring for mounting in an annular groove of one of the sealing members and also a freely projecting wiping portion extending radially inwardly and beyond the radial inner end of the metal ring, the wiping portion being adapted to contact and wipe against the land of the other bearing member. At least one notch is formed partially into one side of the elastomeric bead just adjacent the outermost periphery of the metal ring, the notch being of sufficient size to enable access therein with a probe tool for removing the seal by applying an outward force to an accessible peripheral portion of the flat metal ring.

Referring to FIGS. 1 to 3, the composite seal 10 of the invention is shown comprising an annular sealing disc 11 of rubber or similar elastomeric material bonded to a metal ring 12 of steel or other suitable metal, the disc having a peripheral bead 13 which extends beyond the periphery 14 of the metal ring. In the embodiment shown in FIGS. 2 and 3, the periphery of the metal ring comprises a flanged over portion 15 such that, in cross section, the metal ring is L-shaped. However, this is not necessary as will appear from the embodiment shown in FIG. 6.

In addition, the annular sealing disc has a freely projecting wiping portion 16 extending radially inwardly and beyond radial inner end 17 of the metal ring. In order to adapt the seal for easy removal from the bearing, it is provided with at least one notch 18, preferably a plurality of notches, formed partially into one side of the elastomeric bead as shown in FIGS. 1 and 2. In FIG. 1, three notches 18 are shown substantially equally spaced about the periphery of the seal, each of the notches extending partially into the side face of bead 13 from the side of the seal having the face of elastomeric material. As shown in FIG. 2, the depth of notch 18 is such that its bottom is just adjacent periphery 14 of metal ring 12, a thin layer 14a of the elastomeric material covering the metal ring, whereby a seal removing tool can be inserted into the notch for contacting and applying a removing force at the bottom of the notch against the metal ring without damaging the elastomeric material. The freely projecting wiping portion of 16 of the sealing disc is axially off-set slightly as shown, the radial inner end 17 of the metal ring being surrounded on both sides by the elastomeric material, the metal ring providing stiffness to the sealing disc in this region of the seal to ensure retainment of lubricant within the annular chamber defined by the inner and outer annular bearing members shown in FIG. 4.

Referring now to FIG. 4, the combination of the antifriction bearing and the seal provided by the invention is shown comprising outer annular bearing member 20 and inner member 21 provided with races 22a and 22b which receive a complement of rolling elements, e.g., balls 22, retained in position by a retainer or cage comprising elements 23 and 24. Outer annular bearing member 20 has a pair of annular seal-mounting grooves 25 and 26 which are transversely curved between annularly extending radial shoulders 25a and 26a and extending lands 25b and 26b, respectively. The inner bearing member is provided with annular lands 27 and 28 against which the freely projecting end portion 16 of the seal bears in wiping engagement therewith. The inner bearing member is provided with a bore 29 for mounting the bearing onto a shaft (not shown).

Other embodiments of the novel seal construction are shown in FIGS. 5 and 6. FIG. 5 is similar to FIG. 2 except that a small recess or socket 30 is provided on the periphery of the turned-over flange portion 15 of the reinforcing metal ring for receiving the end of a removing tool to ensure positive engagement of the tool with the metal ring for applying a removing force to the seal, while avoiding any damage of the elastomeric material.

In the embodiment of FIG. 6, the metal ring 12 has no flange at the peripheral end 31. As shown, the peripheral end is easily accessible with a seal-removing tool.

As will be readily appreciated from the embodiment of FIG. 4, the invention is also directed to an antifriction bearing comprising an inner annular bearing member concentrically located within an outer annular bearing member, which members define an annular chamber containing a complement of rolling elements. One of the annular bearing members has a peripheral groove spaced on each side of the chamber containing the rolling elements, the other member having a land opposite each of said peripheral grooves. A pop-out seal is mounted in each of peripheral grooves, the seal comprising a metal ring having concentrically bonded thereto on at least one face thereof an annular sealing disc of resilient elastomeric material, the annular sealing disc having a peripheral bead which extends beyond the periphery of said metal ring. The seal has a freely projecting wiping portion extending radially inwardly and beyond the inner radial end of said metal ring, and at least one notch formed partially into one side of said elastomeric bead sufficient to render a peripheral portion of the metal ring accessible to a removing tool, whereby the seal can be removed from the bearing by inserting a probe tool into the notch and applying pressure to said peripheral portion of the metal ring.

Although the present invention has been described in conjunction with preferred embodiments, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. An antifriction bearing comprising an inner annular bearing member concentrically located within an outer annular bearing member, which members define an annular chamber therebetween containing a complement of rolling elements, one of said annular bearing members having a peripheral groove spaced on each side of said rolling elements, the other of said annular bearing member having a land opposite each of said peripheral grooves, and a pop-out seal mounted in the peripheral groove on each side of said rolling elements comprising a metal ring having concentrically bonded thereto on at least one face thereof an annular sealing disc of resilient elastomeric material, said annular sealing disc having a peripheral bead of said elastomeric material which extends beyond the periphery of said metal ring and is deformed into the bottom of the peripheral groove, a freely projecting wiping portion extending radially inwardly and beyond the inner radial end of said metal ring, in flexing engagement with the land of the other bearing member and at least one notch formed partially into one side of said elastomeric bead adjacent the periphery of the metal ring sufficient to allow entrance of a removing tool, whereby said seal can be removed from the bearing by inserting a probe tool into the notch and applying pressure to the bottom thereof against the metal ring.

2. The antifriction bearing of claim 1 wherein the outer periphery of the metal ring bonded to the sealing disc is flanged over to provide an L-shaped cross-section and wherein said at least one notch renders accessible a portion of said flanged over periphery for contact by a seal-removing tool.

3. The antifriction bearing of claim 2 wherein the accessible flanged over portion of the periphery of the metal ring is recessed to receive the end of the seal-removing tool.

4. An annular composite pop-out seal comprising a metal ring having concentrically bonded thereto on at least one face thereof an annular sealing disc of resilient elastomeric material, said annular sealing disc having a peripheral bead of said elastomeric material which extends beyond the periphery of said metal ring, a freely projecting wiping portion extending radially inwardly and beyond the inner radial end of said metal ring, and at least one notch formed partially into one side of said elastomeric bead adjacent the periphery of the metal ring sufficient to allow entrance of a removing tool, whereby said seal can be removed from the bearing by inserting a probe tool into the notch and applying pressure to the bottom thereof against the metal ring.

5. The seal of claim 4 wherein the outer periphery of the metal ring bonded to the sealing disc is flanged over to provide an L-shaped cross-section and wherein said at least one notch renders the bottom thereof accessible for contact by a seal-removing tool.

6. The seal of claim 5 wherein the flanged over portion of the periphery of the metal ring in the notch is recessed to receive the end of the seal-removing tool.

References Cited

UNITED STATES PATENTS

| 2,467,049 | 4/1949 | Peterson | 308—187.2 X |
| 2,486,270 | 10/1949 | Fawick | 308—187.1 |
| 2,617,698 | 11/1952 | Gaines | 308—187.1 |
| 2,755,113 | 7/1956 | Baumheckel | 308—187.2 X |
| 2,902,300 | 9/1959 | Schultz | 308—187.2 X |
| 2,917,328 | 12/1959 | Peterson | 308—187.1 |

FOREIGN PATENTS

| 783,031 | 9/1957 | Great Britain. |
| 843,382 | 8/1960 | Great Britain. |

MARTIN P. SCHWADRON, Primary Examiner.

LUCIOUS L. JOHNSON, Assistant Examiner.

U.S. Cl. X.R.

277—9